United States Patent [19]

Sakurazawa

[11] 4,182,230
[45] Jan. 8, 1980

[54] APPARATUS FOR FRYING NOODLES

[75] Inventor: Hatuo Sakurazawa, 15 Shinozuka, Fujioka-shi, Gunma-ken, Japan

[73] Assignees: Acecoor Co., Ltd., Osaka; Hatuo Sakurazawa, Fujioka, both of Japan

[21] Appl. No.: 795,222

[22] Filed: May 9, 1977

[30] Foreign Application Priority Data

May 19, 1976 [JP] Japan .................................. 51-58224

[51] Int. Cl.² .......................... A23L 1/16; A47J 37/00
[52] U.S. Cl. ........................................ 99/349; 99/404; 99/407; 99/443 C; 100/151; 100/177; 426/439
[58] Field of Search ................. 99/404, 403, 356, 349, 99/351, 353, 443 C, 407; 426/439, 438, 512, 451, 505, 496, 104, 111, 113, 115, 394, 396; 100/151, 177; 53/124 CC, 124 B, 24

[56] References Cited

U.S. PATENT DOCUMENTS

| 1,055,384 | 3/1913 | Brune et al. ..................... 100/151 X |
| 1,461,509 | 7/1923 | Adelmann ............................... 99/351 |
| 1,563,985 | 12/1925 | Balling .................................... 99/351 |
| 2,484,963 | 10/1949 | Samuel .................................... 99/351 |
| 2,522,175 | 9/1950 | Hill ......................................... 99/349 |
| 2,833,654 | 5/1958 | Sonnenshein et al. ........... 426/512 X |
| 3,780,193 | 12/1973 | Jersey ..................................... 426/505 |
| 3,892,874 | 7/1975 | Ando ................................... 426/439 X |
| 3,905,285 | 9/1975 | Campbell et al. ................. 99/404 X |
| 3,997,676 | 12/1976 | Ando ................................... 426/439 X |

FOREIGN PATENT DOCUMENTS 2530702  1/1977  Fed. Rep. of Germany ........... 426/505

Primary Examiner—Kenneth M. Schor

[57] ABSTRACT

A method of frying noodles which comprises filling raw noodles in a frying vessel whose volume has been temporarily enlarged by being fitted with a frame; closing the opening of the frame by a cap board; dipping the raw noodles together with the frying vessel in a frying oil to fry the raw noodles; and progressively reducing the inner volume of the frying vessel temporarily enlarged by the fitting of the frame, thereby compressing the fried noodles with a uniform density into a lump assuming a prescribed shape.

Also disclosed is an apparatus for frying noodles.

1 Claim, 3 Drawing Figures

APPARATUS FOR FRYING NOODLES

This invention relates to a method and apparatus for frying noodles used as instant food.

As is well known, the fried noodles can be restored to instant food by being dipped in boiling water for several minutes. Therefore, a lumpy mass of fried noodles hermetically wrapped in a heat-preserving container together with proper condiments and ingredients is now marketed in large quantities. Since the heat-preserving container is used concurrently as a hot water-treating vessel as well as a food wrapper, the contents can be served as instant food simply by pouring hot water into the container.

However, packed fried noodles commercially available to date have the drawbacks that where a container of noodles is subject to frequent shakings during transportation and, if the container is set upside down in shipment, crisp fried noodles received therein are often broken or the whole mass of the contents get out of shape. To resolve the above-mentioned problems, it is considered advisable to fill fried noodles in a container with a uniform density and compress the packed mass into such a lumpy form as closely abuts against the inner walls of the container, namely, it is necessary to fry noodles together so as to present said lumpy shape.

The customary practice to attain this object is to fill an almost overflowing amount of raw noodles in, for example, a frying vessel having a gas-permeability and assuming a cup shape substantially conforming to the inner volume of a container in which fried noodles are finally marketed; and dip the noodles together with the frying vessel in a frying oil tank with the noodles tending to overflow from the opening of the frying vessel forced inward by a cap board, thereby compressing a mass of fried noodles into such a lumpy form as fits in with the inner volume of the frying vessel. However, the above-mentioned noodle-frying method has the drawbacks that since it is necessary to provide prior to frying a larger amount of noodles than the inner volume of the frying vessel, noodles filled in the frying vessel often overflow therefrom; work of pushing overflowing noodles back into the frying vessel consumes a great deal of manpower, resulting in a decline in the efficiency of manufacturing fried noodles.

Further disadvantages of the conventional method of preparing fried noodles are that since an overflowing amount of raw noodles is forced at once into the frying vessel from the top, a packing force is absorbed only in the upper portion of the filled mass and is not uniformly transmitted to the lower portion thereof, causing noodles to be fried under such condition that the noodles are densely gathered in the upper section of the frying vessel and sparsely collected in the lower section thereof, and consequently providing a lumpy mass of fried noodles whose upper portion is formed of densely gathered noodles and whose lower portion contains sparsely collected noodles. The noodles occupying the lower position of the lump are likely to be broken during not only cooling and packing but also subsequent transportation, causing the bottom portion of a container to be devoid of noodles and probably resulting in a weight-deficient lump of noodles. Further, a lump of fried noodles thus irregularly packed in a container fails to admit of uniform hot water treatment, imparting an unpleasant feeling to the tongue of a taster. Since a larger amount of noodles is filled in the frying vessel than its inner volume, noodles do not satisfactorily flow through a frying oil tank during frying, and hot oil does not easily flow into the central portion of the lump of noodles, resulting in time-consuming and ununiform frying. Furthermore, possible production of insufficiently fried noodles raises problems in the quality control of fried noodles. The above-mentioned drawbacks similarly occur with respect to other forms of noodles, for example, spaghetti if prepared by the customary method.

The invention has been accomplished to eliminate difficulties hitherto encountered in the manufacture of fried noodles, and is intended to provide a method and apparatus for frying noodles which can fry numerous noodles together in the lumpy form, in which the fried noodles are gathered with a uniform density and which assumes a shape conforming to the inner volume of a container in which the fried noodles are finally marketed.

This invention can be more fully understood from the following detailed description when taken in conjunction with the accompanying drawings, in which.

Figure 1:
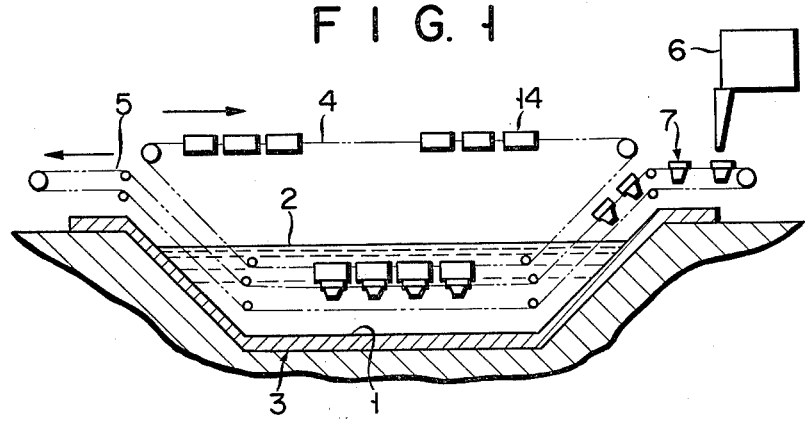
FIG. 1 is a schematic side elevation, partly in section, of the entire apparatus of the invention.

The method and apparatus of this invention for manufacturing fried noodles will now be described by reference to the accompanying drawings.

Reference is first made to a frying apparatus. Referential numeral 1 denotes a flat-bottomed shallow frying pan-shaped heating vessel. Provided in the heating vessel 1 is a frying oil tank 3 which is filled with thermally liquefied edible oil 2, for example, lard. The heating vessel 1 is heated by, for example, an oil burner (not shown) to maintain the edible oil 2 at a prescribed level of temperature. Part of upper and lower endless conveyors 4, 5 are made to run through the oil tank 3 substantially in the horizontal direction. These endless conveyors 4, 5 face each other at a prescribed vertical distance. This distance is progressively decreased, as later described, in the running direction of the endless conveyors 4, 5. Both terminal sections of the lower endless conveyor 5 are positioned outside of the oil tank 3. That section of the conveyor 5 which enters the oil tank 3 is made to travel horizontally. Provided above the forward section of the lower endless conveyor 5 is a noodle feeder 6 which supplies a prescribed amount of noodle to each frying vessel. The lower endless conveyor 5 reciprocates through the oil tank 3 in a horizontal direction. Or, if necessary, the lower endlers conveyor 5 may reciprocate along the underside of the oil tank 3. A large number of frying vessels 7 are spatially arranged on the lower endless conveyor 5 in its traveling direction. The frying vessel 7 is made of, for example, stainless steel and is shaped like a cup to conform to the inner volume of a container in which fried noodles are finally marketed. The bottom of the frying vessel 7 is bored with many oil holes 8. When the lower endless conveyor 5 enters the oil tank 3, the frying vessel 7 mounted on the endless conveyor 5 has its opening directed to the upper endless conveyor 4 running above the oil tank 3.

Figure 2:
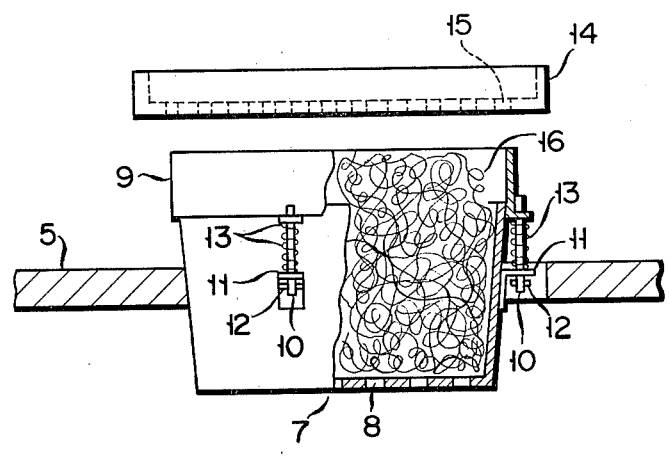
FIG. 2 is a side elevation, partly in section, of a frying vessel just before a cap board is pressed against a frame attached to the frying vessel.
Figure 3:
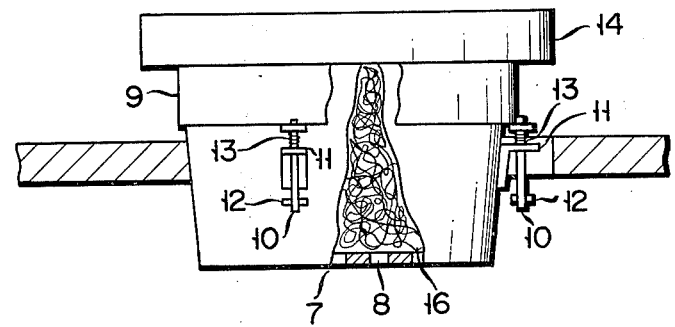
FIG. 3 is a side elevation, partly in section, of the frying vessel, where the cap board has fully pressed the frame downward.

As shown in FIG. 2, a cylindrical frame 9 is slidebly fitted to the periphery of the frying vessel 7. A plurality of downward projecting support rods 10 are provided in several places on the peripheral edge of the cylindrical frame 9. The lower end portion of the support rod 10 is inserted into a through hole bored in the horizontally projecting portion of a support member 11 mounted on the peripheral surface of the frying vessel 7. A stopper pin 12 is fitted to the penetrating end of the support rod 10 to prevent the cylindrical frame 9 from coming off the frying vessel 7. Between the cylindrical frame 9 and support member 11, a coil spring 13 is fitted around the support rod 10 to cause the cylindrical frame 9 to project above the opening of the frying vessel 7 by the urging force of the coil spring 13.

Returning to FIG. 1, many cap boards 14 are spatially arranged on the upper endless conveyor 4 in its traveling direction. These cap boards 14 are made to face the frying vessels 7 when they are carried through the oil tank 3. Each cap board 14 is made of, for example, stainless steel, like the frying vessel 7. If necessary, the cap board 14 is bored with many oil holes 15 as shown in FIG. 2. The distance at which the upper and lower endless conveyors 4, 5 face each other in the oil tank 3 is so chosen as to cause the cap board 14 entering the oil tank 3 lightly to touch and close the opening of the cylindrical frame 9 which projects above the opening of the frying vessel 7 by the force of the coil spring 13. A little before leaving the oil tank 3, the cap board 14 pushes the frame 9 down to the lowest point, causing the frame 9 substantially to abut against the edge of the opening of the frying vessel 7. Namely, while traveling onward, the frame 9 engaged with the frying vessel 7 is progressively pushed downward by the cap board 14.

There will now be described the process by which noodles are fried by a frying apparatus arranged as described above. The upper endless conveyor 4 fitted with the cap boards 14 and the lower endless conveyor 5 fitted with the frying vessels 7 are made to run simultaneously at the same speed in the same direction. The noodle feeder 6 lets fall a substantially overflowing amount of noodles 16 successively on each frying vessel 7 carried under the feeder 6. At this time, noodles are fitted in the frying vessel 7 in such an amount as overflows from the vessel itself. Since, however, the inner volume of the frying vessel 7 is temporarily enlarged by the extent to which the frame 9 attached to the frying vessel 7 projects upward therefrom, the noodles fitted in the frying vessel 7 are not thrown outside, eliminating the otherwise required work of forcing the overflowing noodles back into the frying vessel 7 as has been the case with the conventional noodle-manufacturing method. Noodles 16 filled in the frying vessel 7 are dipped in the oil tank 3 when the frying vessel 7 is brought into the oil tank 3 by the run of the lower endless conveyor 5. A little after or before the dipping of the frying vessel 7 in the oil tank 3, the cap board 14 mounted on the upper endless conveyor 4 approaches or touches the edge of the opening of the frame 9 to close said opening. Since, at this time, the inner volume of the frying vessel 7 is temporarily made larger than the amount of noodles filled therein due to the attached frame 9 being pushed upward, the noodles 16 can be loosened from each other in the frying vessel 7 immediately after dipped in the oil tank 3, namely in the initial stage of frying, and consequently can easily flow through the frying oil. Accordingly, the frying oil is fully transmitted to those of the noodles 16 which occupy the central portion of a noodle lump, thereby admitting of an uniform frying operation, and consequently suppressing the formation of insufficiently fried noodles.

Further, while the frying vessel 7 travels onward through the oil tank 3, namely, according as the frying operation proceeds, the frame 9 attached to the frying vessel 7 is progressively pushed downward by the cap board 14 mounted on the upper conveyor 4 to reduce the temporarily enlarged inner volume of the corresponding frying vessel 7, causing the noodles filled therein to be gathered from the loosened state. When that portion of the inner volume of the frying vessel 7 which was temporarily enlarged by the frame 9 attached thereto is substantially eliminated, then the fully fried noodles 16 are gathered with a uniform density into a lump assuming a shape conforming to the inner volume of the frying vessel 7, namely, the inner volume of a container in which the fried noodles are to be finally marketed.

The frying vessel 7 is taken out of the oil tank 3 with the received noodles 16 fully fried. The cap board 14 which has been placed up to this point on the frame 9 is released to leave the frying vessel 7 open. When that section of the lower endless conveyor 5 in which the mounted frying vessel 7 is now filled with fried noodles passes along the underside of the oil tank 3, then the frying vessel 7 is turned upside down gravitationally to let fall a lump of fried noodles 16.

The thus fried noodles 16 gathered with a uniform density into a lump is saved from damage, not only preventing the occurrence of a weight-deficient noodle lump, but also admitting of a subsequent uniform hot water treatment. When received in a marketing container, a lump of fried noodles conforming to the inner volume of the container has its peripheral surface tightly attached to the inner walls of the container. The lump firmly held in the container is saved from jolting and in consequence from damage even when subjected to shakings during transportation.

With the noodle-frying apparatus of this invention arranged as described above, the extent to which the frame 9 attached to the frying vessel 7 is made to rise above the opening of said frying vessel 7 is progressively reduced to decrease the inner volume of the frying vessel 7 temporarily enlarged by the lifting of the frame 9. The upper endless conveyor 4 is fitted with a plurality of cap boards 14, and the lower endless conveyor 5 with a plurality of frying vessels 7 each provided with the frame 9. The distance at which the upper and lower endless conveyors 4, 5 are spaced from each other in the frying oil tank 3 is progressively narrowed in the traveling direction. The cap board 14 pushes downward the frame 9 of the corresponding frying vessel 7 to decrease the temporarily enlarged inner volume of said frying vessel 7 according as both endless conveyors 4, 5 are moved forward. However, the subject noodle-frying apparatus may be arranged in a different way. Namely, the object of this invention can be attained by another type of noodle-frying apparatus in which the upper and lower endless conveyors 4, 5 are spaced from each other at a fixed distance and the frame 9 is mounted on the underside of the lower endless conveyor 5, and there is further provided, for example, a rail-like lifting member which slidably touches the underside of the frying vessel 7 to push the frying vessel 7 progressively upward as it is moved more onward. In either case, application of endless conveyor can obviously attain the tonnage manufacture of fried noodles.

Further, with the foregoing enbodiment, both endless conveyors 4, 5 were made to face each other in a vertical direction and run in a horizontal direction. But it is possible, if desired, to let both endless conveyors 4, 5 face each other in the horizontal direction and run both conveyors 4, 5 horizontally or vertically. Moreover where the weight of a lump of noodles being fried is changed, it is of course advisable to attach a frame 9 of different height to the frying vessel 7. However, the object is attained by another process. Namely, the position occupied by the stopper pin 12 on the support rod 10 projecting downward from the frame 9 is made changeable, thereby adjusting the extent to which the frame 9 attached to the frying vessel 7 projects above the opening of said frying vessel 7. This arrangement can control the extent to which the inner volume of the frying vessel 7 is temporarily enlarged by the lifting of the frame 9, using the same frame.

What is claimed is:

1. A noodle-frying apparatus comprising a frying oil tank, means for heating a frying oil in the frying oil tank, a plurality of liquid-permeable frying vessels, a plurality of open frames slidably fitted to the periphery of each vessel such that the frame telescopes over the periphery of the frying vessel without being detached from the frying vessel, means for spring biasing each frame relative to the frying vessel to cause the frame to extend sufficiently above the open end of the frying vessel to permit the inner volume of the frying vessel to be temporarily enlarged, a plurality of cap members each engageable with an open end of a corresponding frame in face to face relationship, first conveyor means for supporting the vessels equipped with the frames and for periodically positioning the same within the tank, and second conveyor means for conveying the respective cap members into the frying oil tank in synchronism with the vessels, said first and second conveyor means being located with respect to each other such that the distance between the two within the tank progressively narrows in the direction of travel of the two conveyors, whereby the temporarily enlarged inner capacity of the vessels equipped with the frames is gradually decreased by progressively increased force exerted by the cap members on the respective frames as the two conveyor means progress through the tank.

* * * * *

UNITED STATES PATENT OFFICE
CERTIFICATE OF CORRECTION

Patent No. 4,182,230          Dated January 8, 1980

Inventor(s) HATUO SAKURAZAWA

It is certified that error appears in the above-identified patent and that said Letters Patent are hereby corrected as shown below:

Assignee:    ACECOOK CO., LTD., Osaka, Japan
and Hatuo SAKURAZAWA,
Gunma-Ken, Japan

*Signed and Sealed this*

*Tenth* Day of *June 1980*

[SEAL]

*Attest:*

SIDNEY A. DIAMOND

*Attesting Officer*      *Commissioner of Patents and Trademarks*